United States Patent
Shepherd et al.

(10) Patent No.: US 8,705,080 B2
(45) Date of Patent: Apr. 22, 2014

(54) AUTOMATED PRINT SHOP SERVICE CAPABILITY DETERMINATION

(75) Inventors: Michael David Shepherd, Ontario, NY (US); Barry Glynn Gombert, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 1987 days.

(21) Appl. No.: 11/853,245

(22) Filed: Sep. 11, 2007

(65) Prior Publication Data

US 2009/0066992 A1 Mar. 12, 2009

(51) Int. Cl.
 *G06F 3/12* (2006.01)

(52) U.S. Cl.
 USPC .......... 358/1.15; 358/1.14; 358/1.18; 705/12; 703/22; 719/330; 717/146; 717/144

(58) Field of Classification Search
 None
 See application file for complete search history.

(56) References Cited

U.S. PATENT DOCUMENTS

| | | | |
|---|---|---|---|
| 5,794,050 A * | 8/1998 | Dahlgren et al. | 717/144 |
| 6,502,087 B1 | 12/2002 | Tsuiki et al. | |
| 6,543,364 B2 * | 4/2003 | Wes et al. | 102/490 |
| 6,546,364 B1 * | 4/2003 | Smirnov et al. | 703/22 |
| 6,678,698 B2 | 1/2004 | Fredell et al. | |
| 6,990,636 B2 | 1/2006 | Beauchamp et al. | |
| 7,013,410 B2 * | 3/2006 | Asauchi | 714/46 |
| 7,034,952 B2 * | 4/2006 | Okuda et al. | 358/1.15 |
| 7,184,160 B2 * | 2/2007 | El-Gazzar et al. | 358/1.15 |
| 7,715,037 B2 * | 5/2010 | Castellani et al. | 358/1.15 |
| 7,734,492 B2 * | 6/2010 | Sun et al. | 705/7.12 |
| 7,823,123 B2 * | 10/2010 | Sabbouh | 717/106 |
| 7,840,033 B2 * | 11/2010 | Kurzweil et al. | 382/114 |
| 7,912,804 B1 * | 3/2011 | Talwar et al. | 706/47 |
| 2002/0073161 A1 | 6/2002 | Yamazaki et al. | |
| 2003/0033167 A1 | 2/2003 | Arroyo et al. | |
| 2004/0088647 A1 | 5/2004 | Miller et al. | |
| 2004/0098284 A1 | 5/2004 | Petito et al. | |
| 2004/0193465 A1 * | 9/2004 | Sangroniz et al. | 705/8 |
| 2005/0065830 A1 * | 3/2005 | Duke et al. | 705/7 |
| 2006/0197973 A1 * | 9/2006 | Castellani et al. | 358/1.14 |
| 2006/0206883 A1 * | 9/2006 | Sabbouh | 717/146 |
| 2006/0242097 A1 | 10/2006 | Gu et al. | |
| 2006/0253213 A1 | 11/2006 | Ocke et al. | |

OTHER PUBLICATIONS

Horridge, Matthew et al. "A Practical Guide to Building OWL Ontologies Using The Protege-OWL Plugin and CO-ODE Tools" Edition 1.0, The University of Manchester, Aug. 27, 2004, pp. 1-117.

* cited by examiner

*Primary Examiner* — Ashish K Thomas
(74) *Attorney, Agent, or Firm* — Fox Rothschild LLP

(57) ABSTRACT

A print shop management method or system is used for a print shop. The method or system uses a knowledge base containing device data elements and service data elements. Each device data element represents a device in the print shop, and each service data element represents a service that may be implemented by one or more of the devices. A workflow management system implements an automated reasoner that, when a new device is added or one or more parameters of a device in the print shop are modified, uses semantic reasoning to select a service that may be implemented by the modified device, updates the knowledge base to include a new device element for the new or modified device; and automatically associates the new device element and the selected service.

14 Claims, 4 Drawing Sheets

AUTOMATED PRINT SHOP SERVICE CAPABILITY DETERMINATION

BACKGROUND

1. Technical Field

The present disclosure generally relates to document production environments, such as print shops and other areas where one or more groups of equipment are configured to work together and provide a variety of document production services.

2. Background

Document production environments, often referred to as print shops, contain multiple resources that work together to produce a variety of types of documents, and/or provide a variety of document production services. The services available at a print shop may depend on the resources available at that print shop and how the resources are configured together. A workflow management system may be available to automate the delivery of various services in the print shop. When a new resource is added to a print shop and the new resource adds or modifies a service capability, the workflow management system must be updated with new programming or other data that allows the system to both recognize that a new service is available, and also to automatically deliver that service. This can increase the cost of operation of a print shop by requiring manual updating of workflow management systems, as well as by delaying the delivery of new service capabilities until the updating occurs.

The embodiments described herein are directed to addressing one or more of the problems described above.

SUMMARY

In an embodiment, a method of automatically managing a configuration change in a print shop includes maintaining a knowledge base of product data elements, device data elements and service data elements. Each device data element represents a device that is available to process a print job in the print shop. Each product data element represents a product that can be produced by the print shop. Each service data element represents a service that may be implemented by a group of the devices available in the print shop. The embodiment includes received an updated product data element that corresponds to a new or changed product to be produced in the print shop, using an automated semantic reasoner in a workflow management system to select a device and a service that may be used to produce the product, updating the knowledge base to include the updated product element, and automatically associating the updated product element, the selected service and the selected device in the knowledge base.

Optionally, in the embodiment described above, the receiving includes receiving an identification of a device configuration for a product that is available in the print shop. The method also may include using the semantic reasoner to infer a profile for the selected service, and automatically associating the selected service and the updated product element, either directly or indirectly via the selected service, with the inferred profile. The method also may include receiving, by the workflow management system, an instruction to perform a print job that includes the selected service, and implementing, also by the workflow management system, the selected service on the device. Each service data element in the knowledge base may be associated with a process, a profile and a grounding, and the updating may include automatically associating the selected service and the updated product element, either directly or indirectly via the selected service, with the selected service's process, profile and grounding. The selecting may include accessing the knowledge base for assertions relating to services available for products having that are of similar type as the new or changed product.

In an alternate embodiment, a print shop management system includes a print shop having multiple devices that are configured to process multiple print job types, a knowledge base containing product data elements, device data elements and service data elements. Each device data element represents a device in the print shop, each product data element represents a product that can be produced by the print shop, and each service data element represents a service that may be implemented by one or more of the devices. The system includes a workflow management system having a processor and a computer-readable storage medium programmed with instructions to cause the processor to implement an automated reasoner. When an updated product element is received by the print shop, the automated reasoner uses semantic reasoning to select a device and service that may be used to produce the product, updates the knowledge base to include the updated product element, and automatically associates the updated product element, the service data element for the selected service, and the device element for the selected device in the knowledge base.

In an alternate embodiment, a method of automatically managing a configuration change in a print shop includes maintaining a knowledge base containing product data elements, device data elements and service data elements, receiving an updated product data element which includes an updated print shop device configuration, using an automated semantic reasoner in a workflow management system to select a device and a service that may be used to produce a product that corresponds to the updated product element, updating the knowledge base to include the updated product element, and automatically associating the updated product element, the selected service and the selected device in the knowledge base.

DETAILED DESCRIPTION

Before the present methods and systems are described, it is to be understood that this invention not limited to the particular systems, methodologies or protocols described, as these may vary. The terminology used herein is for the purpose of describing particular embodiment only, and is not intended to limit the scope of the present disclosure which will be limited only the appended claims.

As used herein and in the appended claims, the singular forms "a," "an," and "the" include both the singular and plural references unless the context clearly dictates otherwise. Unless defined otherwise, all technical and scientific terms used herein have the same meanings as commonly understood by one of ordinary skill in the art. As used herein, the term "comprising" means "including, but not limited to."

For purposes of the discussion contained herein, a "print shop" refers to a collection of devices and resources that work together to produce documents. Devices may include devices such as printers, cutters, collators, inserters, shrink wrapping devices and the like. The print shop may be a freestanding entity, including one or more print-related devices, or it may be part of another business or other entity. Additionally, the print shop may communicate with one or more servers by way of a local area network (LAN) or a wide area network (WAN), such as the Internet, the World Wide Web or the like. In addition, a print shop may be contained within a single location, or it may include multiple devices that work together in multiple locations to produce documents, with communication capabilities via a communication network.

The term "device" refers to a machine used to perform an operation. Exemplary devices in a print shop include printers, cutters, collators, inserters, shrink wrapping devices and the like.

A "resource" refers to an element of a print shop that performs a function. A resource can be a device or manpower. For example, in a print shop, a human operator may be required to operate a device or transport an intermediate work product, such as a printed document, between or among devices as part of a job.

A "job" refers to a logical unit of work that is to be completed for a customer. For example, a job may include one or more instructions and one or more parameters that, when processed, result in an output. In a print shop, a job may include one or more print jobs from one or more customers. A production system may process a plurality of jobs.

A "print job" refers to a job that is processed in a print shop. For example, a print job include one or more instructions and one or more parameters that, when processed, result in printed documents, such as credit card statements corresponding to a certain credit card company, bank statements corresponding to a certain bank, books, magazines or the like.

Figure 1:
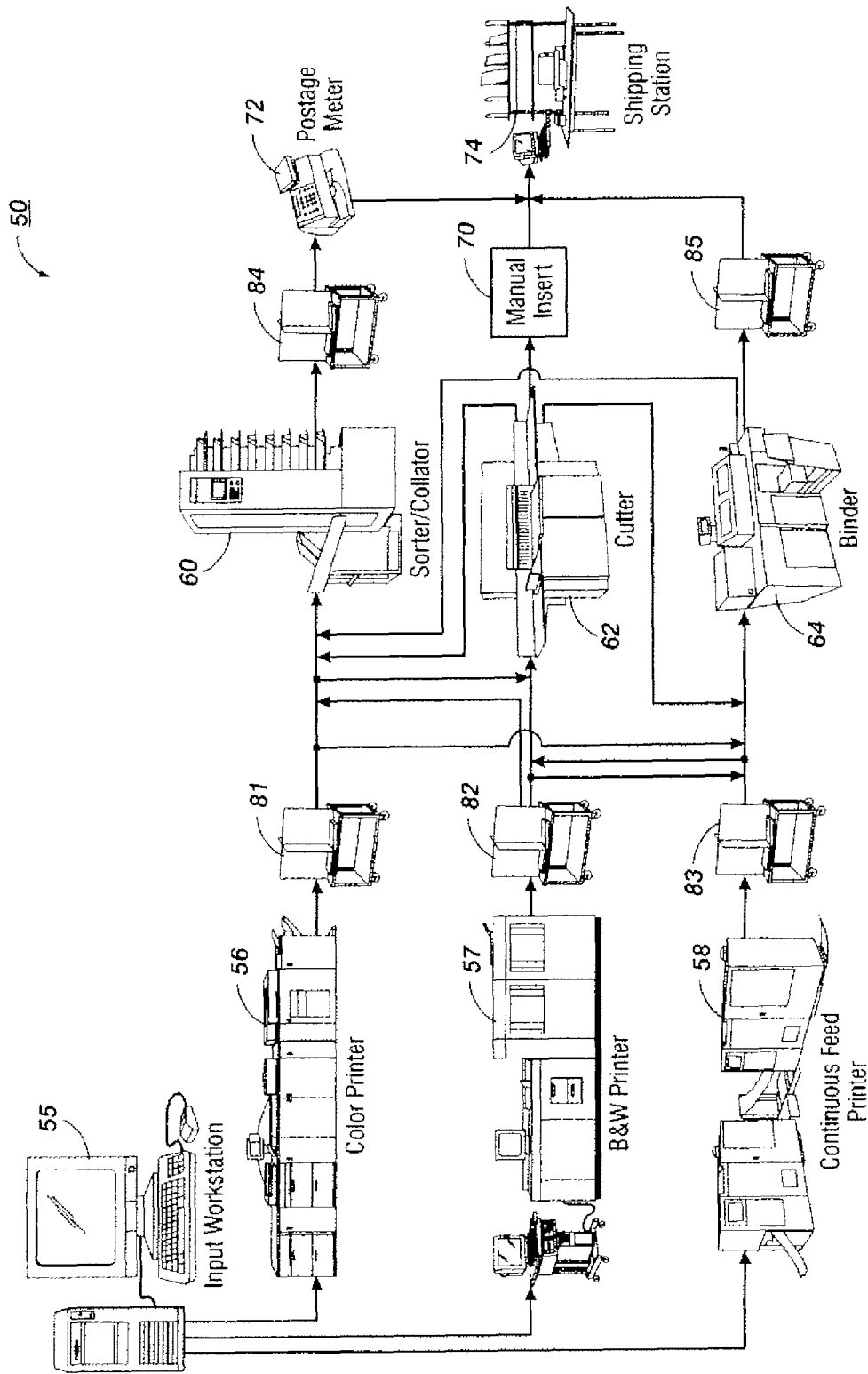
FIG. 1 depicts exemplary elements of a print shop.

FIG. 1 shows an example of a collection of devices that may be included in a print shop 50. Print jobs may enter the print shop manually or electronically and be collected at an electronic submission system 55, such as a computing device and/or scanner or other workstation. Print jobs are sorted and batched at the submission system or another location, such as a workflow management system, before being delivered to one or more print engines, such as a color printer 56, black-and-white printer 57 and/or a continuous feed printer 58. Printed documents may exit a print engine and be delivered to one or more finishing devices or resource groups such as a collator 60, cutter 62 and/or binder 64. The finishing devices or resources may include automatic or manual devices or resources for such finishing activities, and they also may include an automatic or manual inserter 70. Finally, the documents may move to a postage metering station 72 and/or shipping station 74 to hold the documents for delivery and/or direct the documents to another location. Documents for print Jobs may move from one location to another in the print shop by automatic delivery or manual delivery, such as by hand or by one or more paper carts 81-85.

Figure 2:
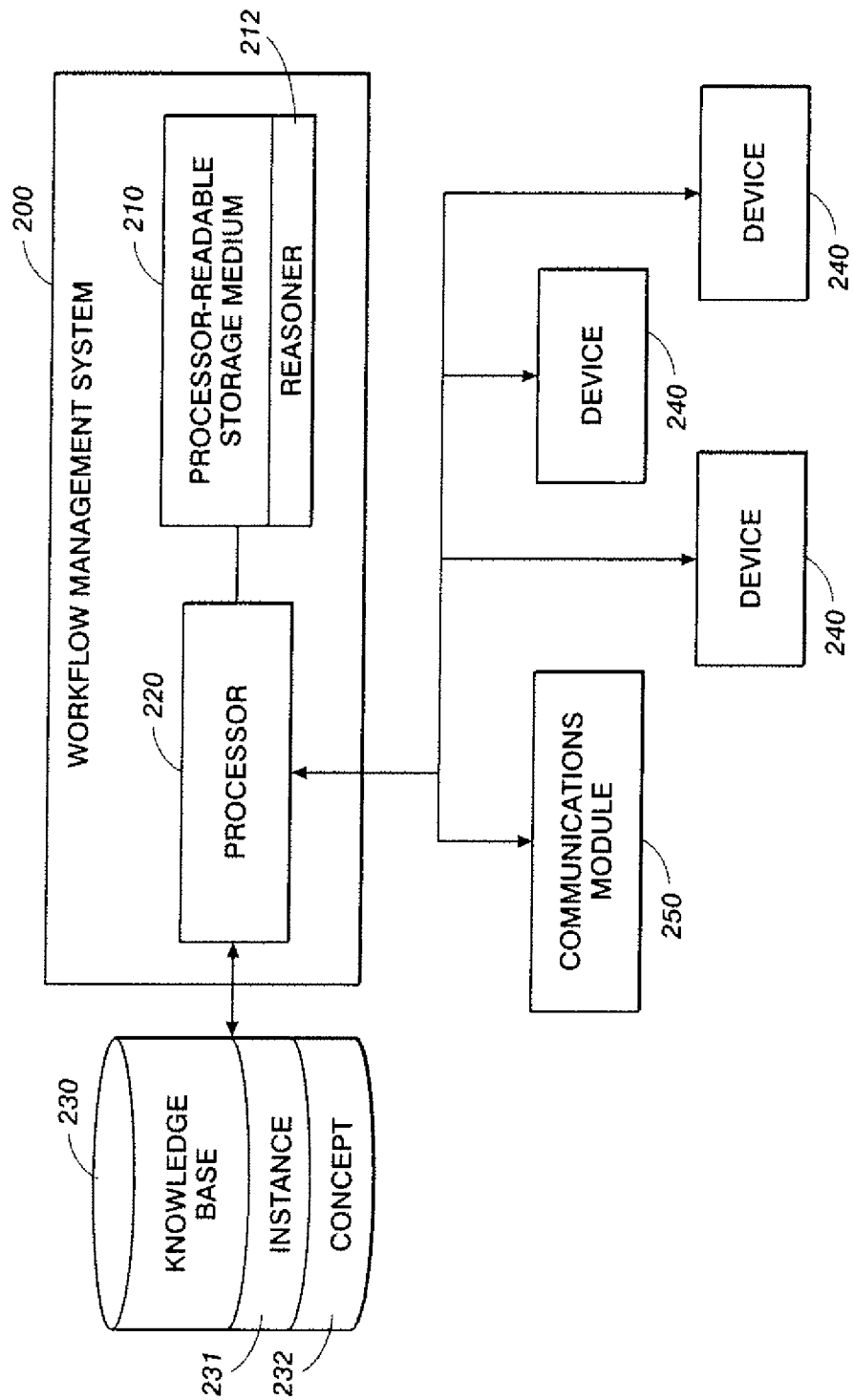
FIG. 2 depicts, in block diagram format, exemplary elements of a print shop workflow management system, knowledge base and print shop devices.

A print shop may be able to provide various different types of document production processes. Referring to FIG. 2, a workflow management system 200 may analyze incoming jobs and instructions, monitor print shop activity, and communicate with the input workstation (55 of FIG. 1) to receive instructions and/or advise a user of the document production services that are available. The workflow management system 200 may include a processor-readable storage medium 210 that stores instructions and a processor 220 that implements those instructions. The processor communicates with the devices 240 in the print shop, and it also may use a communications module 250 to communicate with one or more external devices so that jobs may be routed to a different location if the workflow management system's print shop is busy or does not have a desired capability.

The workflow management system may have access to a knowledge base, such as a database (e.g., element 230 in FIG. 2). The knowledge base may be a semantic knowledge base in that the data contained in the knowledge base is in the form of an ontology such as web ontology language (OWL), which is released by the World Wide Web Consortium, or another format that allows for the description of both concepts and relationships between concepts. The knowledge base 230 includes various data elements, including instance elements 231 and concept elements 232. The processor-readable storage medium 210 may store reasoning software 212 that instructs the processor to provide for automatic classification of the concept and instance elements in the knowledge base 230.

Figure 3:
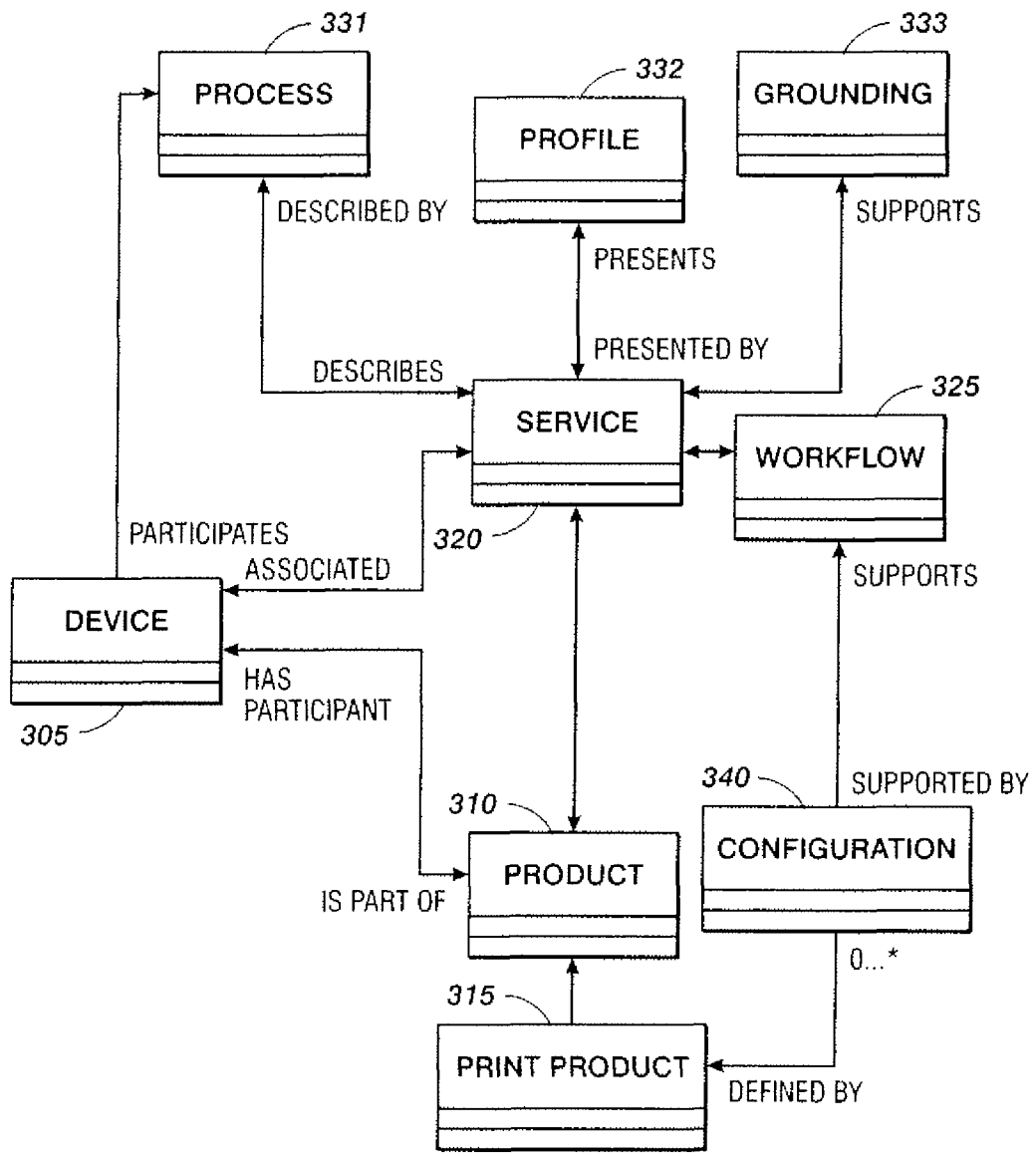
FIG. 3 depicts exemplary elements and associations between elements in a knowledge base.

An instance element 231 represents a real world object, such as a device in a print shop or a product to be produced by a print shop. A concept 232 is a data element representing a class of product, service or device which provides for action(s) that can be taken by instance elements (such as a group of devices) or which results in one or more instance elements (such as a product). Referring to FIG. 3, in the embodiments described herein, instance elements in the knowledge base include data elements corresponding to devices 305 and/or products 310. Concept data elements in the knowledge base include data elements for services 320 and one or more workflows 325. A service 320 may be associated with or represented by a set of concept elements such as a process 331, a profile 332 and a grounding 333. A process 331 identifies the actions that a service may take, while a profile 332 represents the interfaces of the devices or types of devices that may be used to implement the process, along with inputs, outputs and/or preconditions required to implement the service. A grounding 333 is the abstract concept of a service reduced into an executable format, such as job definition format (JDF), web services language (WSDL), job control language (JCL) or Java data structures library (JDSL) format.

A service 320 may be associated with one or more devices 305 used to implement the service and/or products 310 that result from the service. A product 310 is a piece of equipment that includes multiple devices, such as a combination print device/scan device/copy device. Optionally, one or more products may be classified as a "pivot product" that must exist if a particular workflow is to be supported. For example, a digital print shop may require at least a digital front end and digital printer. In addition, a service 320 may be part of, or used to support, a workflow 325, and the available workflows will depend on the configuration 340 of the devices that are present in the print shop. In the example embodiment, a service includes one or more profiles, a process, and one or more groundings. Each print shop workflow includes one or more services, and a given print job represents a workflow instance with one or more service instances. A service is performed by one or more devices, and a product offering can include one or more services. In a given print shop or set of networked print shops, the knowledge base is populated with the specific products, devices and services that are available in that shop. The workflow management system and/or input workstation may include a user interface that includes a wizard-type application that allows a user to view, add, remove and/or change the individual and concept elements and their associations in the knowledge base.

Figure 4:
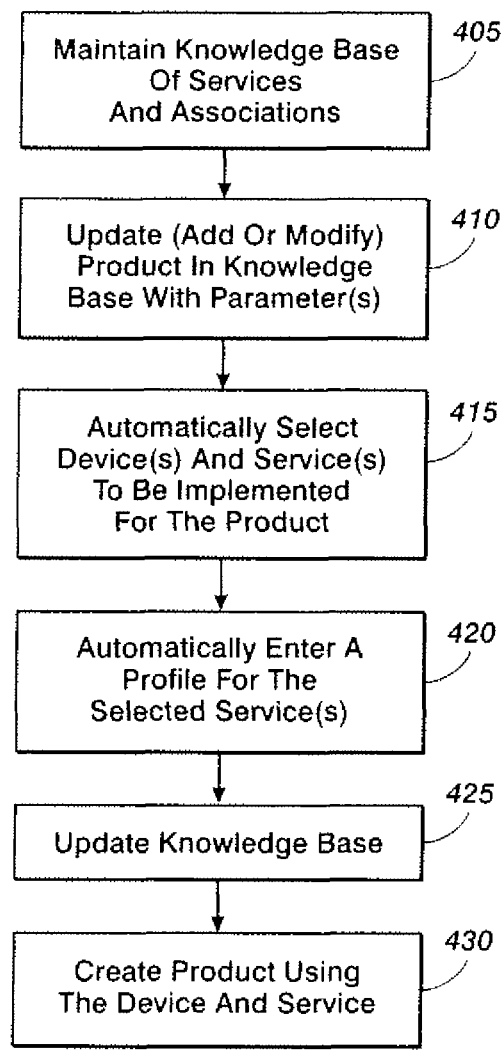
FIG. 4 is a flowchart of an exemplary print shop management method.

At the outset, referring to FIG. 4, a knowledge base will be pre-populated and maintained 405 with a set of assertions regarding a service's association with products, devices, processes, profiles and/or groundings. When a new product is added to a print shop, the product is added 410 to the knowledge base, either automatically by handshaking or other device-to-management system communication, or manually by user input through a workstation. The reasoner will then operate on the processor to automatically select and associate 415, via automated reasoning, the device(s) and services for the new product in the print shop. The automated reasoner may perform this action by accessing the knowledge base for logic assertions relating to similar product types with devices and services, as well as assertions about particular configurations of devices and services in a print shop to related service profiles, processes and groundings. The reasoner also may automatically infer 420 profile(s), process(es) and/or grounding(s) for the service based on assertions for various device/service combinations in the knowledge base. The reasoner may then cause the processor to update 425 the knowledge base with the new or modified service and profile elements. The updating 425 may include associating the service element with the updated product element. The updating 425 also may include associating the profile element with the product element, either directly or indirectly via the service element. A product may then be created 430 with the selected service(s) and associated device(s).

During deployment, a user can use an application that operates on the knowledge base to view, add, remove and change a print shop's configuration of devices or device parameters. To add a product or change a configuration, the user need only identify the product, and in some cases the user may input the device's or product's parameters. The reasoner then operates to cause the processor to access the knowledge base and, using assertions that are available in the knowledge base, update the knowledge base with the new or modified service(s) that are available in the print shop because of the device addition or modification.

It will be appreciated that various of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art which are also intended to be encompassed by the disclosed embodiments.

What is claimed is:

1. A method of automatically managing a configuration change in a print shop, comprising:
   maintaining a knowledge base containing a plurality of product data elements, a plurality of device data elements and a plurality of service data elements, wherein each device data element represents a device that is available to process a print job in a print shop, wherein each product data element represents a product that can be produced by the print shop and wherein each service data element represents a service that may be implemented by a group of the devices available in the print shop, and wherein each service data element includes:
   a process that identifies a set of actions taken by the service,
   a profile that identifies one or more devices and defines inputs, outputs, and preconditions required to implement the service, and
   a grounding that reduces the service to an executable format;
   receiving an updated product data element, wherein the updated product element corresponds to a new or changed product to be produced in the print shop;
   selecting, using an automated semantic reasoner in a workflow management system, a device and a service that may be used to produce the product by accessing the knowledge base for logic assertions relating to product data elements that are similar to the updated product data element;
   inferring, using the automated semantic reasoner, a process, a profile, and a grounding for the selected service based on logic assertions device/service combinations in the knowledge base that are similar to the selected device and selected service;
   updating the knowledge base to include the updated product element; and
   automatically associating, in the knowledge base, the updated product element, the selected service and the selected device.

2. The method of claim 1, wherein the receiving comprises receiving an identification of a device configuration for a product that is available in the print shop.

3. The method of claim 1, further comprising:
   inferring, using the semantic reasoner, a profile for the selected service; and
   automatically associating the selected service and the updated product element, either directly or indirectly via the selected service, with the inferred profile.

4. The method of claim 1, further comprising:
   receiving, by the workflow management system, an instruction to perform a print job, wherein the print job includes the selected service; and
   implementing, by the workflow management system, the selected service on the device.

5. The method of claim 1, wherein the updating comprises automatically associating the selected service and the updated product element, either directly or indirectly via the selected service, with the selected service's process, profile and grounding.

6. The method of claim 1 wherein the selecting comprises accessing the knowledge base for assertions relating to services available for products that are of similar type as the new or changed product.

7. A print shop management system, comprising:
   a print shop comprising a plurality of devices that are configured to process a plurality of print job types;
   a knowledge base containing a plurality of product data elements, device data elements and service data elements, wherein each device data element represents a device in the print shop, wherein each product data element represents a product that can be produced by the print shop, and wherein each service data element represents a service that may be implemented by one or more of the devices, each service data element includes:
   a process that identifies a set of actions taken by the service,
   a profile that identifies one or more devices and defines inputs, outputs, and preconditions required to implement the service, and
   a grounding that reduces the service to an executable format; and
   a workflow management system that includes a processor and a computer-readable storage medium, the storage medium programmed with instructions to cause the processor to implement an automated reasoner that, when an updated product element is received by the print shop:

selects, using semantic reasoning, a device and service that may be used to produce the product by accessing the knowledge base for logic assertions relating to product data elements that are similar to the updated product data element;

infers, using semantic reasoning, a process, a profile, and a grounding for the selected service based on logic assertions for device/service combinations in the knowledge base that are similar to the selected device and selected service;

updates the knowledge base to include the updated product element; and automatically associates, in the knowledge base, the updated product element, the service data element for the selected service, and the device element for the selected device.

8. The system of claim 7, wherein each profile further includes at least one device configuration required to implement its associated service.

9. The system of claim 7, wherein the knowledge base further comprises a plurality of workflow data elements and a plurality of device configuration data elements, wherein each workflow is associated with one or more service data elements and one or more device configuration data elements.

10. A method of automatically managing a configuration change in a print shop, comprising:

maintaining a knowledge base containing a plurality of product data elements, device data elements and service data elements, each service data element includes:
- a process that identifies a set of actions taken by the service,
- a profile that identifies one or more devices and defines inputs, outputs, and preconditions required to implement the service, and
- a grounding that reduces the service to an executable format;

receiving an updated product data element, wherein the updated product data element comprises an updated print shop device configuration;

selecting, using an automated semantic reasoner in a workflow management system, a device and a service that may be used to produce a product that corresponds to the updated product element by accessing the knowledge base for logic assertions relating to product data elements that are similar to the updated product data element;

inferring, using the automated semantic reasoner, a process, a profile, and a grounding for the selected service based on logic assertions for device/service combinations in the knowledge base that are similar to the selected device and selected service;

updating the knowledge base to include the updated product element; and automatically associating, in the knowledge base, the updated product element, the selected service and the selected device.

11. The method of claim 10, further comprising:
automatically associating the selected service and the updated product element, either directly or indirectly via the selected service, with the inferred profile.

12. The method of claim 10, further comprising:
receiving, by the workflow management system, an instruction to perform a print job, wherein the print job includes the selected service; and
implementing, by the workflow management system, the selected service on the device.

13. The method of claim 12, wherein the updating comprises automatically associating the selected service and the updated product element, either directly or indirectly via the selected service, with the selected service's process, profile and grounding.

14. The method of claim 12 wherein the selecting comprises accessing the knowledge base for assertions relating to services available for products that are of similar type as the new or changed product.

\* \* \* \* \*